US009503940B2

(12) United States Patent
Huang et al.

(10) Patent No.: US 9,503,940 B2
(45) Date of Patent: Nov. 22, 2016

(54) METHOD, DEVICE AND BASE STATION FOR HANDOVER CONTROL

(75) Inventors: Min Huang, Beijing (CN); Yongquan Qiang, Beijing (CN); Angelo Centonza, Winchester (GB); Huichun Liu, Beijing (CN); Weidong Kong, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/413,221

(22) PCT Filed: Jul. 6, 2012

(86) PCT No.: PCT/CN2012/000939
§ 371 (c)(1),
(2), (4) Date: Jan. 6, 2015

(87) PCT Pub. No.: WO2014/005247
PCT Pub. Date: Jan. 9, 2014

(65) Prior Publication Data
US 2015/0141014 A1 May 21, 2015

(51) Int. Cl.
*H04W 36/00* (2009.01)
*H04W 36/08* (2009.01)
(52) U.S. Cl.
CPC ..... *H04W 36/0061* (2013.01); *H04W 36/0083* (2013.01); *H04W 36/08* (2013.01)
(58) Field of Classification Search
CPC .................................................. H04W 36/12
USPC ....................................................... 455/436
See application file for complete search history.

(56) References Cited

U.S. PATENT DOCUMENTS

| 8,548,477 B2 * | 10/2013 | Hapsari | H04W 4/20 370/331 |
| 2007/0254667 A1 * | 11/2007 | Jokinen | H04W 36/12 455/436 |
| 2008/0153495 A1 * | 6/2008 | Ogami | H04W 36/30 455/436 |

(Continued)

FOREIGN PATENT DOCUMENTS

| CN | 102238665 A | 11/2011 |
| CN | 102348230 A | 2/2012 |

(Continued)

OTHER PUBLICATIONS

3GPP TS 36.331 v10.4.0;3GPP; Technical Specification Group Radio Access Network; Evolved Universal Terrestrial Radio Access (E-UTRA); Radio Resource Control (RRC); Protocol specification (Release 10); Dec. 2011; 296pgs.

(Continued)

*Primary Examiner* — Santiago Garcia
(74) *Attorney, Agent, or Firm* — NDWE LLP

(57) ABSTRACT

A method, a device and a base station for controlling handover are described. In order to control handover from a source base station to a target base station in a wireless communication system, where the target base station controls multiple cells, preference levels for candidate cells to be used as a target cell for the handover are received from the target base station; and handover parameters for the candidate cells are adjusted by taking the preference levels into account when selecting the target cell for the handover. With the present invention, at least benefits of target eNB inter-cell interference coordination, load optimization among cells, tendency to dedicated-configured cell etc. may be achieved.

22 Claims, 5 Drawing Sheets

(56) References Cited

U.S. PATENT DOCUMENTS

| | | | |
|---|---|---|---|
| 2010/0027507 A1* | 2/2010 | Li | H04W 36/0055 370/331 |
| 2010/0234028 A1* | 9/2010 | Narasimha | H04W 36/0055 455/437 |
| 2010/0273490 A1* | 10/2010 | Velde | H04W 36/0072 455/436 |
| 2011/0028148 A1 | 2/2011 | Lee et al. | |
| 2011/0149913 A1 | 6/2011 | Park et al. | |
| 2011/0269469 A1 | 11/2011 | Xiao et al. | |
| 2011/0275374 A1 | 11/2011 | Narasimba et al. | |
| 2012/0071164 A1* | 3/2012 | Hayashi | H04W 36/12 455/436 |
| 2012/0276900 A1* | 11/2012 | Stephens | H04W 24/02 455/436 |
| 2013/0115949 A1* | 5/2013 | Centonza | H04W 36/245 455/436 |
| 2013/0273918 A1* | 10/2013 | Watanabe | H04W 36/0055 455/436 |
| 2014/0038616 A1* | 2/2014 | Burbidge | H04W 36/18 455/442 |

FOREIGN PATENT DOCUMENTS

| | | |
|---|---|---|
| CN | 102474897 A | 5/2012 |
| EP | 2244505 A1 | 10/2010 |
| GB | 2479534 A | 10/2011 |
| KR | 20120025994 A | 3/2012 |
| WO | 2012011694 A2 | 1/2012 |

OTHER PUBLICATIONS

3GPP TS 36.423 v10.5.0; 3GPP; Technical Specification Group Radio Access Network; Evolved Universal Terrestrial Radio Access Network (E-UTRAN); X2 application protocol (X2AP) (Release 10); Mar. 2012; 132 pgs.

PCT International Search Report for PCT Application No. PCT/CN2012/000939 dated Apr. 18, 2013; 4pgs.

Written Opinion of the International Searching Authority for PCT Application No. PCT/CN2012/000939 dated Apr. 18, 2013; 4pgs.

International Preliminary Report on Patentability, Application No. PCT/CN2012/000939, dated Jan. 15, 2015, 6 pages.

Extended European Search Report, EP Application No. 12880661.9, dated Jul. 15, 2015, 7 pages.

* cited by examiner

METHOD, DEVICE AND BASE STATION FOR HANDOVER CONTROL

CROSS-REFERENCE TO RELATED APPLICATIONS

This application is a National stage of International Application No. PCT/CN2012/000939, filed Jul. 6, 2012, which is hereby incorporated by reference.

TECHNICAL FIELD

The present invention relates generally to the field of wireless communication, and particularly to a method, a device and a base station for handover control.

BACKGROUND

In 3 GPP (the 3rd Generation Partnership Project) LTE-Advanced (Long Term Evolution-Advanced) standardization, the technique of carrier aggregation (CA) brings along heterogeneous characteristics to cells in an evolved Node B (eNB). An eNB may control a number of cells that operate at different carriers, where some cells may have full or partial overlapping coverage areas. When a user equipment (UE) moves into these overlapping coverage areas, the Downlink (DL) and Uplink (UL) data can be transmitted over multiple carriers, by which data rate can be improved greatly.

When a handover from an eNB (source eNB) to a neighboring eNB (target eNB) occurs with respect to the UE, a target cell, i.e. a cell of the neighboring eNB to which the handover is to be directed, need be selected for the handover.

There exist prior art approaches for target cell selection. For example, Soon Gi PARK et al., US Patent Application Publication No. 2011/0149913, discloses determining an optimal frequency band set for downlink and uplink handover based on measurement information collected by a source eNB from a neighboring eNB and a UE. The measurement information is listed as information measured by the user equipment, information measured within the serving base station, and resource information of the neighboring base station.

However, the measurement information is not sufficient for making an optimal target cell selection among multiple neighboring cells in some cases, such as a case where carrier aggregation is employed, a case where interference is not only from the cells of source eNB, and a case where a UE is moving in high speed.

SUMMARY

It is the object to obviate at least some of the above-mentioned disadvantages and provide an improved method, device and base station for controlling handover.

According to a first aspect of the present invention, a method for controlling handover from a source base station to a target base station in a wireless communication system is provided, where the target base station controls multiple cells. In the method, preference levels for candidate cells to be used as a target cell for the handover are received from the target base station; and handover parameters are adjusted for the candidate cells by taking the preference levels into account when selecting the target cell for the handover.

With this method, an advantage may be achieved in that the selected target cell for a handover may be adapted to preferences of the target base station, and thus it is more likely to select an optimal target cell.

According to an embodiment, the wireless communication system supports carrier aggregation and the cells are of cell types of primary cell or secondary cell.

According to another embodiment, the preference levels are set based on at least one of loads on the candidate cells, interferences in the candidate cells, servicing capabilities of the candidate cells, or cell types of the candidate cells. Preferably, a primary cell has a higher preference level than a secondary cell.

According to another embodiment, the preference levels are received through a X2AP message indicating information of non-preferred target cell and/or preferred target cell.

According to another embodiment, the handover parameters comprise Cell Individual Offset (CIO).

According to another embodiment, the adjusting is coordinated with self-optimization network functions used in the source base station. Preferably, the self-optimization network functions include mobility robustness optimization and mobility load balance.

According to a second aspect of the present invention, a device for controlling handover from a source base station to a target base station in a wireless communication system is provided, where the target base station controls multiple cells. The device comprises a receiving unit and an adjusting unit. The receiving unit is configured for receiving from the target base station preference levels for candidate cells to be used as a target cell for the handover. The adjusting unit is configured for adjusting handover parameters for the cells by taking the preference levels into account when selecting the target cell for the handover.

According to a third aspect of the present invention, a base station comprising the above device is provided.

It should be noted that the embodiments described above with respect to the method are also applicable for the device and the base station according to the present invention.

BRIEF DESCRIPTION OF THE DRAWINGS

The foregoing and other objects, features, and advantages of the present invention will become more apparent from the following description of preferred embodiments and accompany drawings.

DETAILED DESCRIPTION

In the following description, for purposes of explanation rather than limitation, specific details, such as the particular architecture, interfaces, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It should be expressly understood that the drawings are included for illustrative purposes and do not represent the scope of the present invention. In the accompanying drawings, like reference numbers in different drawings may designate similar elements.

For the purpose of explanation, the following embodiments are illustrated in the context of 3 GPP LTE-Advanced. However, it will be appreciated that the present invention is not limited to 3 GPP LTE-Advanced. Instead, the present invention is also applicable to other wireless communication systems that comprise base stations supporting handover and controlling multiple cells.

Figure 1:
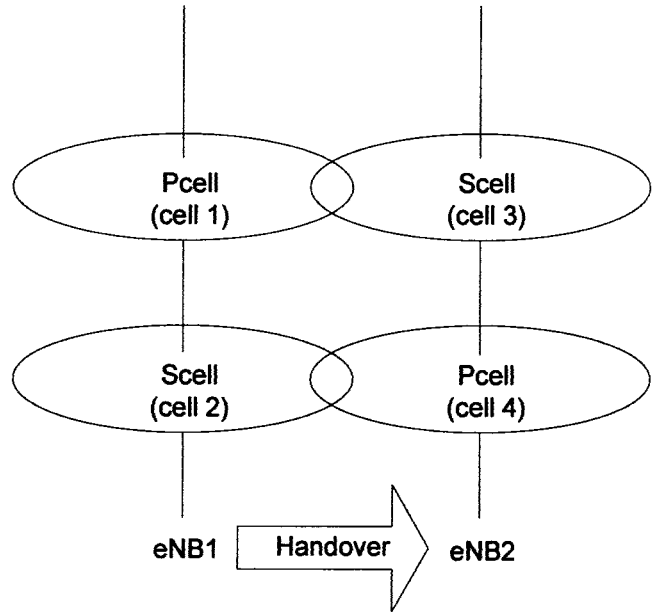
FIG. 1 illustrates a configuration for eNBs.

FIG. 1 illustrates a configuration for eNBs with carrier aggregation. As shown in FIG. 1, two neighboring eNBs, i.e. eNB1 and eNB2, are configured with two cells. Cell 1 and cell 2 are controlled by eNB1, while cell 3 and cell 4 are controlled by eNB2. The coverage areas of cell 1 and cell 2 are partially or fully overlapping, and the same is true for cell 3 and cell 4. Cell 1 and cell 4 are designated as PCell for eNB1 and eNB2, respectively. As shown in FIG. 1, a handover from eNB1 to eNB2 may occur. It will be appreciated that an eNB may be configured with more than two cells and some or all of its cells may be partially or fully overlapping.

Figure 2:
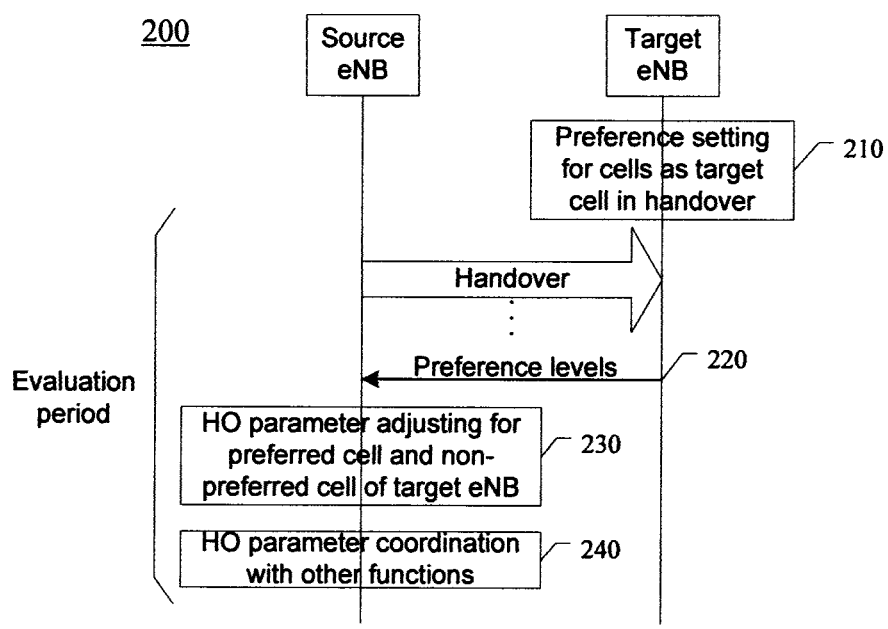
FIG. 2 illustrates a flow chart of a method according to an embodiment of the present invention.

FIG. 2 illustrates a flow chart of a method 200 according to an embodiment of the present invention.

In step 210, a target eNB sets preference levels for candidate cells to be used as target cell(s) for a handover. The candidate cells are candidates for being selected as a target cell. The candidate cells may be some or all of the cells controlled by the target eNB. The target eNB may set the preference levels based on a variety of factors that may reflect its policy of selecting target cell(s) for handover in different aspects.

According to an embodiment, in carrier aggregation, the DL and UL control channels are preferred to be configured in PCell with one carrier frequency, and the carrier frequencies for PCell are interleaving at neighboring eNBs to reduce interference from neighboring cells at the frequency where PCell is located. Hence, a certain priority may preferably be given to the PCell when taking admission control, scheduling or performing other radio resource management (RRM) operations, then the preference level setting may be based on cell type. For example, for an eNB supporting carrier aggregation, a PCell may be assigned to a higher preference level than SCell(s), except for the case where the PCell is overloaded. By setting the preference of PCell as being the target cell for an incoming handover over SCell at target eNB, it results in that the load of incoming handover is leaded to PCell, and hence the inter-cell interference between neighboring eNBs may be reduced.

According to another embodiment, the preference level setting may be based on interferences in cells, where the interference usually comprises inter-cell interferences from cells of a third eNB other than the source and the target eNB. It may comprise interference from other cells under control of the same target eNB, or even it may comprise interference from cells of the source eNB. For example, in a situation where cells experience different interferences, a cell with weaker interference may be assigned to a higher preference level than a cell with stronger interference. By setting the preference of cell with weak interference over cell with strong interference at target eNB, the interference experienced by the UE after handover may be reduced.

According to another embodiment, the preference level setting may be based on serving capabilities of cells. For example, in a situation where some of the cells have high-speed handling capabilities and in case a high-speed UE is moving inward, cells with high-speed-capability may be assigned to higher preference levels than other cells. By setting the preference of cell with capability matching with the UE over other cells, the UE will be better served after handover.

According to another embodiment, the preference level setting may be based on load on cells. In an example, when PCell at the target eNB is overloaded, the preference of PCell over SCell may be alleviated or reversed, so that an incoming handover may be leaded to SCell, which helps to achieve the load optimization.

The target eNB may set the preference levels based on the factors separately or in any combination.

In an example, the preference levels may be indicated by information like "preferred target cells" or "non-preferred target cells".

In step 220, the target eNB notifies the set preference levels to the source eNB. The notification may be implemented using any existing messages or commands for exchanging information between the source eNB and the target eNB. For example, a X2AP message or an Operation and Maintenance (OAM) configuration command (if PCell and SCells are semi-statically configured by OAM) may be used for this notification. By reusing existing messages or commands, or even reusing existing handover (HO) procedure, backward compatibility will be maximally guaranteed and additional complexity will be reduced.

As an alternative, a new message may be created for this notification.

When sending the preference levels via a X2AP message, in addition to information about cell identities (e.g., Cell Global Identifier, CGI) of source cells, the X2AP message may indicate information about non-preferred target cells, or preferred target cells, or both. Here "source cell" refers to a cell at the source eNB in which the handover departs from, "non-preferred target cell" refers to a cell at the target eNB to which the handover is less preferred to be directed, and "preferred target cell" refers to a cell at the target eNB to which the handover is more preferred to be directed.

As an example, the X2AP message may be "Handover Report", but the sending of "Handover Report" may not be limited to handover failure or radio link failure scenarios. An exemplary modification to a X2AP message "Handover Report" is given in table 1.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| Handover Report | M | | ENUMERATED | | YES | ignore |

TABLE 1-continued

| IE/Group Name | Presence | Range | IE type and reference | Semantics description | Criticality | Assigned Criticality |
|---|---|---|---|---|---|---|
| Type | | | (HO too early, HO to wrong cell, HO to non-preferred cell, . . . ) | | | |
| Handover Cause | M | | 9.2.6 | Indicates handover cause employed for handover from eNB2 to eNB1 | YES | ignore |
| Source cell ECGI | M | | ECGI 9.2.14 | ECGI of source cell for handover procedure (in eNB2) | YES | ignore |
| Failure cell ECGI | M | | ECGI 9.2.14 | ECGI of target (eventual failure) cell for handover procedure (in eNB1) | YES | ignore |
| Re-establishment cell ECGI | C- ifHandoverReportType HoToWrongCell or HoToNonPreferredCell | | ECGI 9.2.14 | ECGI of cell where UE attempted re-establishment, or ECGI of the preferred target cell | YES | ignore |

As shown in table 1, an enumerated option "HO to non-preferred cell" is added in Information Element (IE) "Handover Report Type", and options "HoToNonPreferredCell" and "ECGI of the preferred target cell" are added in IE "Re-establishment cell ECGI". Here ECGI means Enhanced Cell Global Identifier.

The notification may be triggered by at least one of below events:

a) an incoming handover is dedicated to a non-preferred cell (this event is referred to "HO to non-preferred cell event"), b) an aggregation of "HO to non-preferred cell event" exceeds a pre-configured threshold, c) a pre-configured criterion is met, for example, when a ratio of handovers to non-preferred cell to handovers to preferred cell within an evaluation period exceeds a pre-configured threshold, the notification will be triggered.

An "HO to non-preferred cell event" may occur when an incoming handover is dedicated to a cell non-preferred by the target eNB. For example, an "HO to non-preferred cell event" may occur when 1) a handover is directed to a SCell of a target eNB, but a PCell is preferred to accommodate the handover in order to coordinate the inter-cell interference and for other considerations like saving energy, 2) a handover is directed to a PCell of a target eNB, but a SCell is preferred since the PCell is over-loaded, 3) a handover is directed to a cell experiencing strong interference, 4) a handover of a high speed UE is directed to a cell without high speed capability.

Alternatively, the notification may be triggered periodically at a fixed interval, or may be after a successful handover.

In step 230, the source eNB receives the preference levels from the target eNB, and adjusts handover parameters associated with the cells by taking their respective preference levels into account. Preferably, the handover parameters are adjusted so that a "preferred target cell" has higher priority or larger possibility to be selected as the target cell for handover than a "non-preferred target cell" in following handover procedure. Handover parameter adjustment is an effective and low-complexity tool to generate different preferences, priorities and possibilities for target cell selection.

Preferably, the source eNB may adjust handover parameters further based on additional information like measurement report from UE. The adjusted handover parameters may be used together with other factors like radio signal quality, network deployment and UE behaviors when determining the target cells for handover. All these factors may be considered collectively to determine target cells for handover.

Preferably, in step 240, the source eNB further coordinates the preference-level-based handover parameter adjustment with other operations that are also associated with handover parameters, including the SON functions like mobility robustness optimization and mobility load balance.

In order to achieve a stable adjustment result, preferably, the source eNB may configure an evaluation period with a preconfigured interval, in which the received preference levels are evaluated and applied.

In one exemplary implementation, an evaluation period is defined for steps 220, 230 and 240. The step 220 may execute one or more times within the evaluation period, while the steps 230 and 240 execute once at the end of evaluation period.

Figure 3:
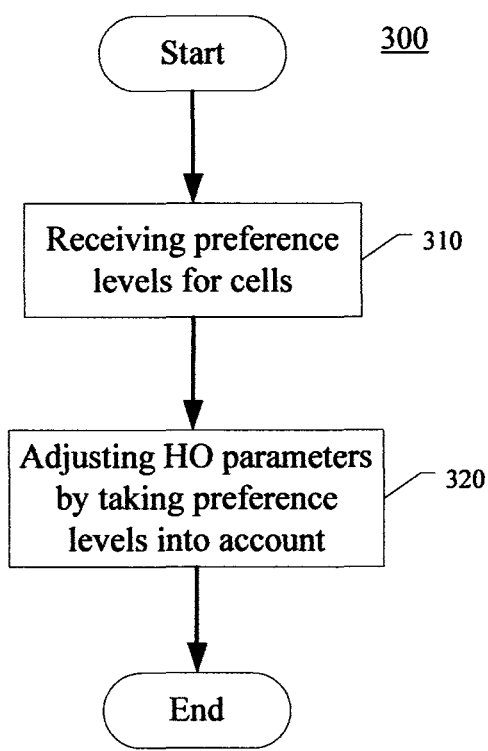
FIG. 3 illustrates a flow chart of a method according to another embodiment of the present invention.

FIG. 3 illustrates a flow chart of a method 300 according to another embodiment of the present invention. This method may be performed at a source eNB.

As shown in FIG. 3, in step 310, a source eNB receives from a target base station preference levels for the cells to be used as a target cell for a handover. Preferably, the source eNB may receive the preference levels via a X2AP message or an OAM configuration command, in which information of non-preferred target cell and/or preferred target cell is indicated. By using existing messages, extra X2AP signaling or RRC signaling is avoided.

In step 320, the source eNB adjusts HO parameters for the cells by taking the preference levels into account when selecting the target cell for the handover.

According to an embodiment, the source eNB controls the target cell prioritization by configuring different HO parameters for corresponding neighboring cell relation (NCR).

In a preferred embodiment, one exemplary HO parameter is cell individual offset (CIO). CIO is defined in 3GPP TS 36.331 v10.4.0. Generally, the higher a difference between CIO for an NCR ($CIO_{NCR}$) (which is defined as CIO at neighboring cell ($CIO_{neighbor}$) minus CIO at serving cell ($CIO_{source}$), i.e. $CIO_{NCR}=CIO_{neighbor}-CIO_{source}$) is, the smaller Reference Signal Received Power (RSRP)/Reference Signal Received Quality (RSRQ) at a target cell is required for measurement report triggering, and hence the handover is advanced. On the contrary, the lower the $CIO_{NCR}$ is, the larger RSRP/RSRQ at a target cell is required for measurement report triggering, and hence the handover is delayed.

Advantages may be provided when adjusting CIO by taking preference levels into account in making handover control. Firstly, since CIO relates directly to radio signal strength, it is more feasible to be compared among the neighboring cell relations in case of a single source cell and multiple candidate target cells, and is more intuitive to control the coverage and to indicate preference levels. Secondly, it has been used in some other SON functions, like mobility robustness optimization and mobility load balance, so that it may be more compatible to legacy LTE functions.

In carrier aggregation, CIO value for PCell may be increased to be higher than CIO value for SCell, then a handover to PCell will be advanced and a handover to SCell will be delayed. If CIO value for PCell is decreased to be lower than CIO value for SCell, the result will be opposite.

In addition to CIO, other handover parameters that are suitable to prioritize cells according to respective preference levels may also be considered to serve the same purpose in a similar way. For example, the handover parameter may be time-to-trigger (TTT). This parameter controls how soon the handover should be triggered when a UE is under low radio signal strength from the serving cell, by which the preferences towards different target cells could be adjusted indirectly. A larger value of TTT for a target cell would lead to a slower handover triggering and hence a smaller preference to be selected as the target cell.

The method according to the present invention provides a way for prioritizing cell/carrier in handover control by taking preference levels from the target eNB into account, which helps to achieve improvements in at least inter-cell interference coordination, load optimization and tendency to dedicated-configured cell at the target eNB.

Figure 4:
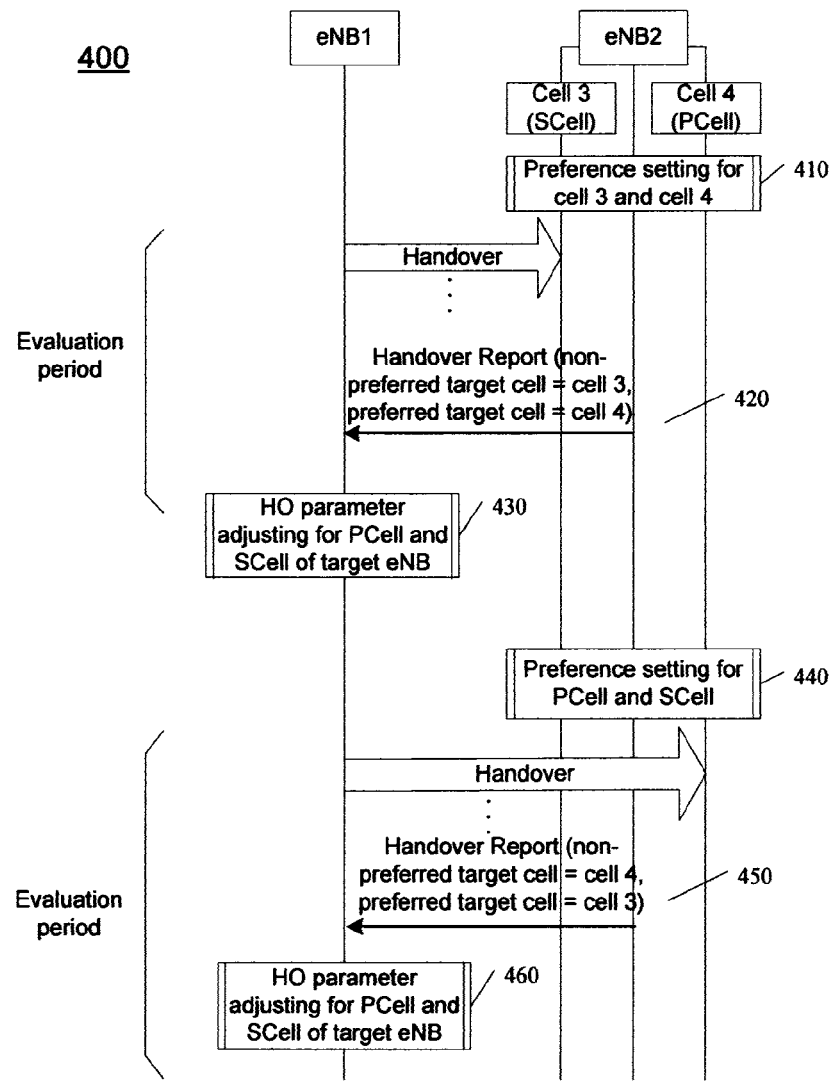
FIG. 4 illustrates a flow chart of a method according to another embodiment of the present invention.

FIG. 4 illustrates a flow chart of a method 400 according to another embodiment of the present invention. This flow chart is described in connection with FIG. 1 and illustrates how a handover control takes effect in changing the target cell.

As shown in FIG. 4, in a first evaluation period, eNB2 acts as a target eNB and sets preference levels for its cells, i.e. cell 3 and cell 4 in step 410. Since cell 4 is the PCell and has sufficient accommodation for a new incoming handover, it is set as preferred target cell. In contrast, cell 3 is set as non-preferred target cell. In this case, the PCell has a higher preference level than the SCell.

The set preference levels are sent in e.g. Handover Report (comprising information like non-preferred target cell=cell 3, preferred target cell=cell 4) to eNB1 that acts as a source eNB in step 420.

ENB1 receives the preference levels of cell 3 and cell 4, and adjusts its HO parameters for both cell 3 and cell 4 in step 430 by taking the preference levels for respective cells into account.

In a second evaluation period, the target eNB changes its handover preferences for its cells. This may occur when e.g. cell 4 is about to be overloaded, and then an incoming handover may be desired to be directed to cell 3 instead.

In this case, eNB2 may reset or change preference levels for cell 3 and cell 4 in step 440. For example, eNB2 may set cell 3 as preferred target cell and cell 4 as non-preferred target cell.

Again, the set preference levels are sent in a Handover Report (comprising information like non-preferred target cell=cell 4, preferred target cell=cell 3) to eNB1 in step 450.

The eNB1 receives the new preference levels of cell 3 and cell 4, and then adjusts its HO parameters for both cell 3 and cell 4 in step 460 according to their newly set preference levels. Since the preference level notification indicates cell 3 as the preferred target cell and cell 4 as the non-preferred target cell, eNB1 would adjust the handover parameters so that the priority of cell 4 as the target cell over cell 3 is decreased.

According to an embodiment, the adjustment of CIO3 and CIO4 is implemented by adjusting their relative difference, e.g. CIO of cell 4 minus CIO of cell 3, denoted as $CIO_{relative}$. The larger $CIO_{relative}$ is, the higher priority or larger possibility that cell 4 (PCell) is selected as target cell. As an example, options for CIO adjustment with respect to handovers from cell 1 or cell 2 in eNB 1 to cell 3 or cell 4 of eNB2 are shown in table 2, in which the relative CIO value (CIO4−CIO3), is increased.

TABLE 2

|  | CIO3: cell1 to cell3, cell2 to cell3 | CIO4: cell1 to cell4, cell2 to cell4 |
| --- | --- | --- |
| Option 1 | decrease | maintain |
| Option 2 | decrease | increase |
| Option 3 | maintain | increase |

When eNB1 receives a notification indicating cell 4 as the non-preferred target cell and cell 3 as the preferred target cell, it would adjust the handover parameters by decreasing $CIO_{relative}$ therebetween, so that the priority of cell 4 being selected as a target cell over cell 3 is decreased.

Preferably, the adjusted CIO3 and CIO4 are sent to UE as measurement configuration.

Figure 5:
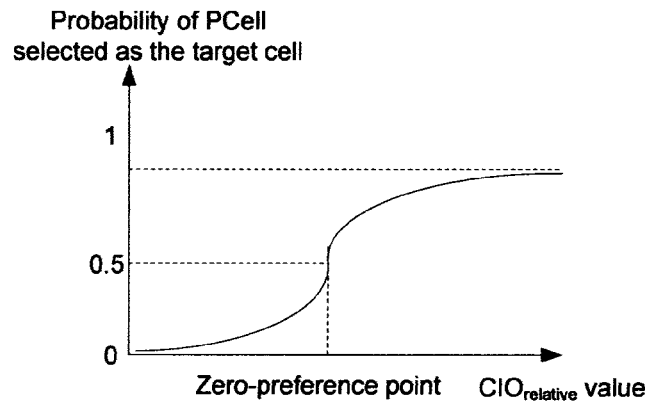
FIG. 5 illustrates a relation curve between the probability of being selected as the target cell and a handover parameter.

FIG. 5 illustrates a relation curve between probabilities of PCell being selected as a target cell versus values of $CIO_{relative}$.

This curve is approaching to 0 or 1 as $CIO_{relative}$ is decreased or increased. There is a point in the curve where the probability value is equal to 0.5, and the corresponding $CIO_{relative}$ value is called as zero-preference point, which could be positive, negative or zero, depending on the carrier deployment in CA. When $CIO_{relative}$ value is larger than zero-preference point, PCell has larger probability to be selected as target cell; on the contrary, when $CIO_{relative}$ value is smaller than zero-preference point, PCell has smaller probability to be selected as target cell.

The CIO adjustment may be considered as a kind of SON operation, and preferably it may be coordinated with other SON functions, including mobility robustness optimization and mobility load balance.

Figure 6:
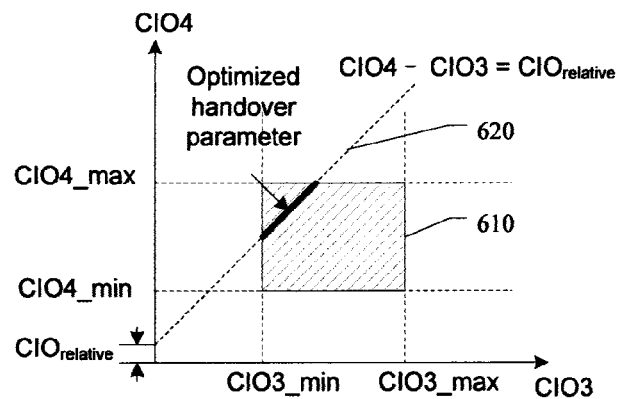
FIG. 6 illustrates coordination of handover parameter with self-optimization network (SON) functions.

FIG. 6 illustrates coordination of CIO adjustment and other SON functions (e.g. mobility robustness optimization, mobility load balance).

As shown in FIG. 6, when considering mobility robustness optimization and mobility load balance, the adjustment of CIO3 and CIO4 are separate and these two parameters have their own allowable scopes, which are shown as the rectangle region 610. When cell prioritization is considered at the same time, a line 620 "CIO4–CIO3=$CIO_{relative}$" is drawn. The part of this line within the rectangle region 610, i.e. the line segment marked with thick line, represents the optimized value of CIO3 and CIO4.

Because in general, mobility robustness performance (mainly indicated by handover successful ratio) is more important than load balance and interference mitigation, this line is preferably guaranteed to pass through the rectangle region; otherwise, the value of $CIO_{relative}$ should be adjusted.

The descriptions hereinbefore focus on a scenario with one source eNB and one target eNB. However, the present invention is not limited to this scenario, but may also be applicable in other scenarios where the target eNB controls multiple cells with coverage overlapping.

Figure 7:
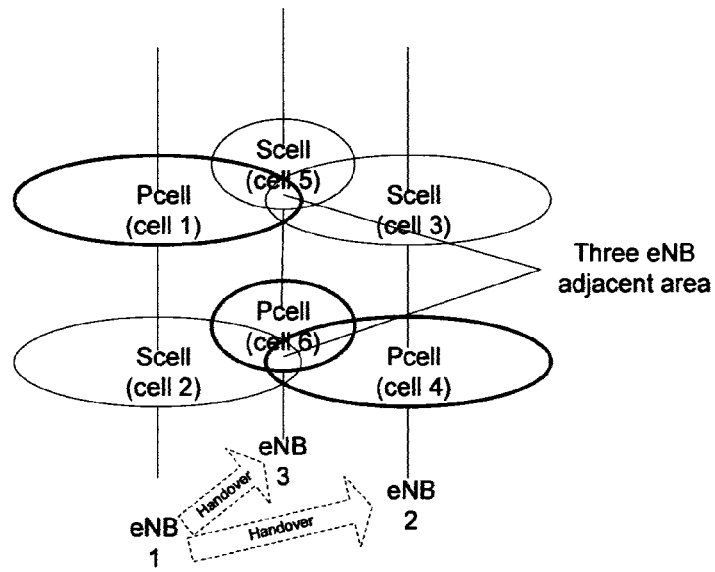
FIG. 7 illustrates a three-eNB scenario.

FIG. 7 illustrates a three-eNB scenario with carrier aggregation.

As shown in FIG. 7, there are three eNBs, including one source eNB, i.e. eNB 1, and two candidate target eNBs, i.e. eNB2 and eNB3. Each eNB has two cells, and cell 4 and cell 6 are designated as PCell for eNB2 and eNB3 respectively.

According to an embodiment, each target eNB sets preference levels for its own two cells. For example, when PCell has higher preference than SCell, eNB2 sets a higher preference level for cell 4 than cell 3 with $CIO_{relative}$=CIO4-CIO3, and eNB3 sets a higher preference level for cell 6 than cell 5 with $CIO'_{relative}$=CIO6-CIO5.

In this scenario, the CIOs may be adjusted as follows. At adjacent areas of the three-eNB, firstly, the setting of $CIO_{relative}$ and $CIO'_{relative}$ should individually follow the mobility robustness requirement at the relation between a source eNB and a target eNB as shown in FIG. 6. Then, the priorities of eNB2 and eNB3 as target eNB may not be directly related to $CIO_{relative}$ and $CIO'_{relative}$, rather, it may depend on the relative difference between CIOs of two PCells of eNB2 and eNB3, i.e. CIO4 and CIO6. If CIO4 is larger than CIO6, eNB2 has higher priority than eNB3 as the target eNB; on the contrary, if CIO4 is smaller than CIO6, eNB2 has lower priority than eNB3. This is determined by the source eNB (eNB2) with reference to information provided by both target eNBs (eNB2 and eNB3).

Figure 8A:
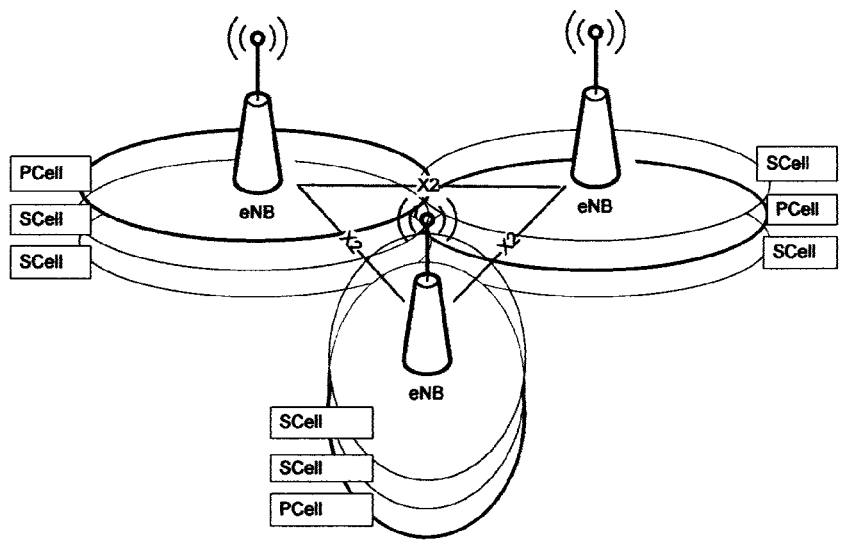
FIG. 8A illustrates a scenario where PCell and SCell are fully overlapped.
Figure 8B:
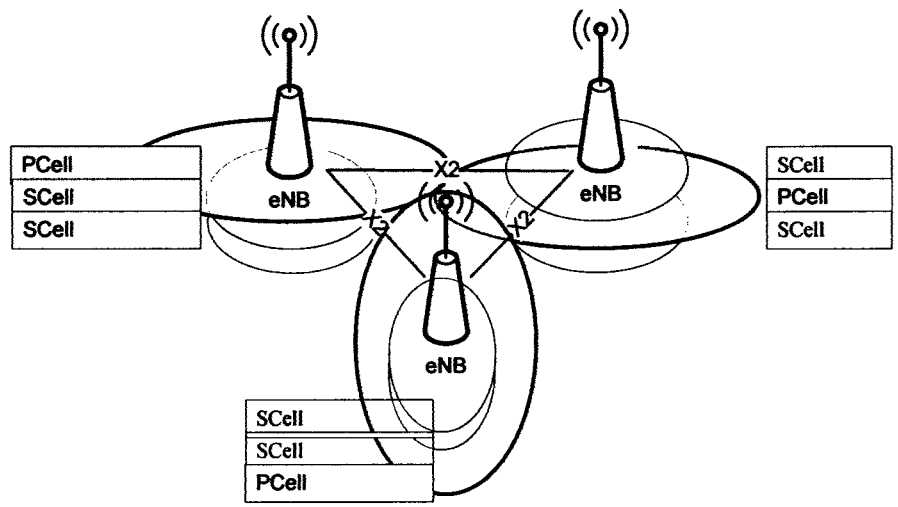
FIG. 8B illustrates a scenario where PCell has larger coverage than SCell.
Figure 8C:
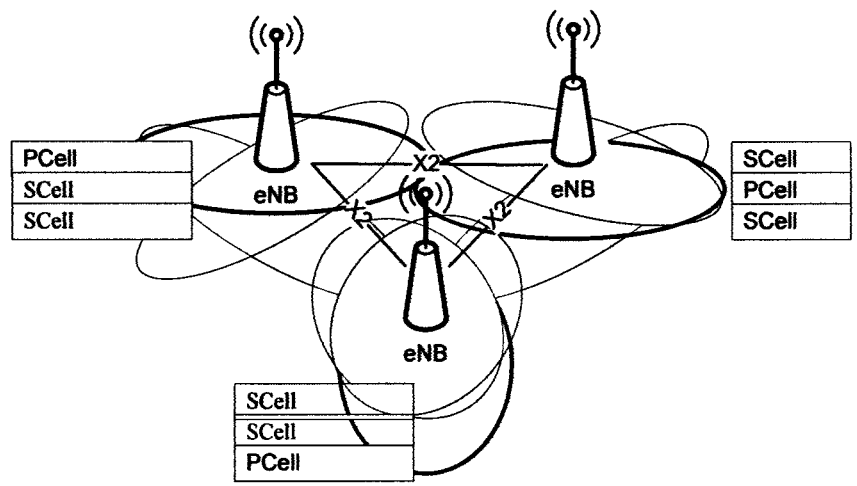
FIG. 8C illustrates a scenario where PCell and SCell are partially overlapped.

FIG. 8A-8C illustrates other exemplary scenarios with carrier aggregation that the present invention may be applied.

FIG. 8A shows a scenario where PCell and SCell are fully overlapped. In this case, the RSRP/RSRQ at PCell or SCell is almost identical and the zero-preference point is close to zero, so that the handover parameter (like CIO) would significantly influence which cell could be selected as target cell for handover. If PCell is preferred to be target cell, $CIO_{relative}$ value may be adjusted to a positive value; otherwise, if SCell is preferred to be the target cell, $CIO_{relative}$ value may be adjusted to a negative value.

FIG. 8B illustrates a scenario where PCell has larger coverage than SCell. In this case, for cell edge area where only PCell covers, the RSRP/RSRQ from SCell is very trivial. The zero-preference point is smaller than zero. To guarantee the PCell priority, $CIO_{relative}$ value could have a larger adjustable scope, not necessarily to be larger than zero.

FIG. 8C illustrates a scenario where PCell and SCell are partially overlapped. In this case, both factors, i.e. radio signal quality (like RSRP/RSRQ) and handover parameter (like CIO), jointly determines the target cell for handover, which results in an optimized tradeoff between the mobility robustness and load preference among cells for CA-activated eNBs. For an area only covered by PCell, zero-preference point is smaller than zero; on the contrary, for the area only covered by SCell, zero-preference point is larger than zero.

It should be noted that although some scenarios are described in context of carrier aggregation, the method according to the present invention is not limited to carrier aggregation technology, but may be applied to general scenarios with multi-carrier/cell coverage.

Figure 9:
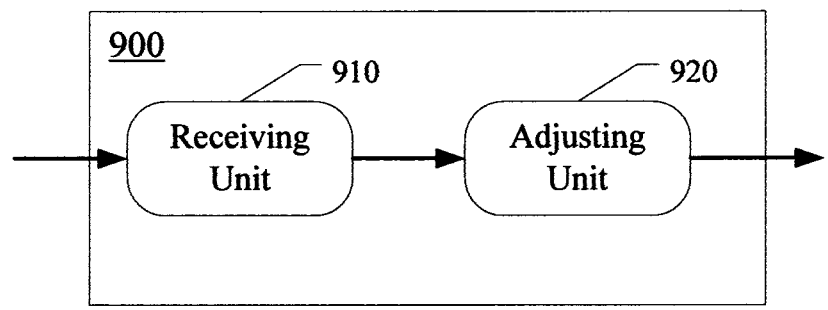
FIG. 9 illustrates a device according to an embodiment of the present invention.

FIG. 9 illustrates a device 900 according to an embodiment of the present invention. The device 900 comprises a receiving unit 910 for receiving preference levels from a target base station preference levels for the cells to be used as a target cell for the handover and an adjusting unit 920 for adjusting HO parameters for the cells by taking the preference levels into account when selecting the target cell for the handover.

The receiving unit 910 may receive preference levels through an X2 interface or a Radio Resource Control interface, and transfer the received preference levels to the adjusting unit 920. Preferably, the receiving unit 910 may receive preference levels from multiple candidate target base stations.

The adjusting unit 920 may adjust CIO for respective cells to be adapted to their preference levels. Preferably, the adjusting unit 920 may further coordinate the handover parameter adjustment with other SOH operations, such as mobility robustness optimization and mobility load balance.

In a wireless communication system, a base station may comprise this device 900 so as to control handover accordingly. The base station may work as a source base station in some scenarios, and work as a target base station in other scenarios. When the base station works as a target base station, it may further comprise other units, such as a unit for setting preference levels for its cells with respect to being used as target cell(s) for a handover.

According to the present invention, cell/carrier prioritization is introduced into handover control, resulting in benefits of target eNB inter-cell interference coordination, load optimization among cells, tendency to dedicated-configured cell etc.

As will be appreciated by one of skill in the art, the present invention may be embodied as a method, apparatus, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method for controlling handover of a mobile communication equipment from a source base station to a target base station in a wireless communication system, wherein the source base station and the target base station each utilizes multiple cells to communicate with the mobile communication equipment, wherein one of the multiple cells is a primary cell and another of the multiple cells is a secondary cell, and wherein the target base station controls its multiple cells for the handover of the mobile communication equipment, the method comprising:
receiving from said target base station preference levels for candidate cells of the multiple cells to be used as target cells for the handover of the mobile communication equipment, wherein the preference levels identify respective preferences for each of the candidate cells for the handover of the mobile communication equipment and wherein the target base station conveys the preference levels for use for the source base station to initiate the handover; and
adjusting handover parameters used by the source base station to initiate the handover of the multiple cells by taking the preference levels of the candidate cells into account to identify which of the candidate cells is to he selected as the primary cell and which of the candidate cells is to be selected as the secondary cell, when selecting the target cells for the handover.

2. The method as claimed in claim 1, wherein said preference levels are set based on at least one of loads on said candidate cells, interferences in said candidate cells, servicing capabilities of said candidate cells, or cell types of said candidate cells.

3. The method as claimed in claim 1, wherein said wireless communication system supports carrier aggregation and the primary cell and the secondary cell are used for carrier aggregation.

4. The method as claimed in claim 3, wherein the primary cell has a higher preference level than the secondary cell.

5. The method as claimed in claim 1, wherein said handover parameters comprise Cell Individual Offset (CIO).

6. The method as claimed in claim 1, wherein said preference levels are received through a X2AP message indicating information of at least one of non-preferred target cell and preferred target cell.

7. The method as claimed in claim 1, wherein said adjusting is coordinated with self-optimization network functions used in said source base station.

8. The method as claimed in claim 7, wherein said self-optimization network functions includes mobility robustness optimization and mobility load balance.

9. A device for controlling handover of a mobile communication equipment from a source base station to a target base station in a wireless communication system, wherein the source base station and the target base station each utilizes multiple cells to communicate with the mobile communication equipment, wherein one of the multiple cells is a primary cell and another of the multiple cells is a secondary cell, and wherein the target base station controls its multiple cells for the handover of the mobile communication equipment, the device comprising:
a receiving unit for receiving from said target base station preference levels for candidate cells of the multiple cells to be used as target cells for the handover of the mobile communication equipment, wherein the preference levels identify respective preferences for each of the candidate cells for the handover of the mobile communication equipment and wherein the target base station conveys the preference levels for use for the source base station to initiate the handover; and
an adjusting unit for adjusting handover parameters used by the source base station to initiate the handover of the multiple cells by taking the preference levels of the candidate cells into account to identify which of the candidate cells is to be selected as the primary cell and which of the candidate cells is to be selected as the secondary cell, when selecting the target cells for the handover.

10. The device as claimed in claim 9, wherein said preference levels are set based on at least one of loads on said candidate cells, interferences in said candidate cells, servicing capabilities of said candidate cells, or cell types of said candidate cells.

11. The device as claimed in claim 9, wherein said wireless communication system supports carrier aggregation and the primary cell and the secondary cell are used for carrier aggregation.

12. The device as claimed in claim 11, wherein the primary cell has a higher preference level than the secondary cell.

13. The device as claimed in claim 9, wherein said handover parameters comprise Cell Individual Offset (CIO).

14. The device as claimed in claim 9, wherein said receiving unit is configured to receive said preference levels through a X2AP message indicating information of at least one of non-preferred target cell and preferred target cell.

15. The device as claimed in claim 9, wherein said adjusting unit is configured to coordinate the adjustment of handover parameters with self-optimization network functions used in said source base station.

16. A base station comprising a device for controlling handover of a mobile communication equipment from a source base station to a target base station in a wireless communication system, wherein the source base station and the target base station each utilizes multiple cells to communicate with the mobile communication equipment, wherein one of the multiple cells is a primary cell and another of the multiple cells is a secondary cell, and wherein the target base station controls its multiple cells for the handover of the mobile communication equipment, the device comprising:
- a receiving unit for receiving from said target base station preference levels for candidate cells of the multiple cells to be used as target cells for the handover of the mobile communication equipment, wherein the preference levels identify respective preferences for each of the candidate cells for the handover of the mobile communication equipment and wherein the target base station conveys the preference levels for use for the source base station to initiate the handover; and
- an adjusting unit for adjusting handover parameters used by the source base station to initiate the handover of the multiple cells by taking the preference levels of the candidate cells into account to identify which of the candidate cells is to be selected as the primary cell and which of the candidate cells is to be selected as the secondary cell, when selecting the target cell for the handover.

17. The device as claimed in claim 16, wherein said preference levels are set based on at least one of loads on said candidate cells, interferences in said candidate cells, servicing capabilities of said candidate cells, or cell types of said candidate cells.

18. The device as claimed in claim 16, wherein said wireless communication system supports carrier aggregation and the primary cell and the secondary cell are used for carrier aggregation.

19. The device as claimed in claim 18, wherein the primary cell has a higher preference level than the secondary cell.

20. The device as claimed in claim 16, wherein said handover parameters comprise Cell Individual Offset (CIO).

21. The device as claimed in claim 16, wherein said receiving unit is configured to receive said preference levels through a X2AP message indicating information of at least one of non-preferred target cell and preferred target cell.

22. The device as claimed in claim 16, wherein said adjusting unit is configured to coordinate the adjustment of handover parameters with self-optimization network functions used in said source base station.

* * * * *